United States Patent
Way et al.

(10) Patent No.: US 12,133,081 B2
(45) Date of Patent: Oct. 29, 2024

(54) COMPUTER-BASED SYSTEMS CONFIGURED FOR ADDING A SECONDARY ELECTRONIC PROFILE TO A PRIMARY ELECTRONIC PROFILE AND METHODS OF USE THEREOF

(71) Applicant: Capital One Services, LLC, McLean, VA (US)

(72) Inventors: Brendan Way, Brooklyn, NY (US); Tyler Maiman, Melville, NY (US); Abdelkader M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 282 days.

(21) Appl. No.: 17/881,256

(22) Filed: Aug. 4, 2022

(65) Prior Publication Data

US 2024/0048992 A1    Feb. 8, 2024

(51) Int. Cl.
*H04W 12/73* (2021.01)
*H04W 12/06* (2021.01)
*H04W 12/08* (2021.01)
*H04W 12/47* (2021.01)

(52) U.S. Cl.
CPC .......... *H04W 12/73* (2021.01); *H04W 12/06* (2013.01); *H04W 12/08* (2013.01); *H04W 12/47* (2021.01)

(58) Field of Classification Search
None
See application file for complete search history.

(56) References Cited

U.S. PATENT DOCUMENTS

| | | | |
|---|---|---|---|
| 10,063,540 B2 | 8/2018 | Wilson et al. | |
| 10,536,440 B2 | 1/2020 | Monibi et al. | |
| 11,095,636 B1* | 8/2021 | Sokolov | H04W 12/068 |
| 2004/0078325 A1 | 4/2004 | O'Connor | |
| 2019/0089688 A1* | 3/2019 | Rathineswaran | H04L 63/105 |
| 2019/0109842 A1 | 4/2019 | Kumar et al. | |
| 2021/0374226 A1* | 12/2021 | Mondello | H04L 63/0815 |
| 2022/0255945 A1* | 8/2022 | Guan | H04L 63/102 |

\* cited by examiner

*Primary Examiner* — Clayton R Williams
(74) *Attorney, Agent, or Firm* — Greenberg Traurig, LLP

(57) ABSTRACT

Systems and methods are disclosed including receiving an electronic access request to add a secondary electronic profile of a secondary user to a primary electronic profile of a primary user. A processor generates and sends a first security challenge to the primary user and a secondary security challenge to the secondary user. The processor receives a response from the primary user in response to the first security challenge and a response from the secondary user in response to the secondary security challenge. The processor authenticates the electronic access request based on the first response being a valid response and the secondary response being a valid response. The processor generates the secondary electronic profile as a nested profile within the primary electronic profile. The processor instructs the primary user device or the secondary user device to display a confirmation of the secondary user being added to the primary electronic profile.

20 Claims, 7 Drawing Sheets

COMPUTER-BASED SYSTEMS CONFIGURED FOR ADDING A SECONDARY ELECTRONIC PROFILE TO A PRIMARY ELECTRONIC PROFILE AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured managing of electronic profiles or accounts, and in particular, to managing the addition of a secondary electronic profile to a primary electronic profile.

BACKGROUND OF TECHNOLOGY

There are situations in which a primary electronic profile holder may wish to enable other members of a group to have access to selected resources or assets of the primary electronic profile. For example, in many households, one person, often a parent, is a primary electronic profile holder who own and manages access to a first account, such as an online streaming subscription service. Thus, the person may wish to add a secondary electronic profile for a dependent, such as a child. Typically, at least one technological problem exists when adding a secondary electronic profile to an existing primary electronic profile, since such process can sometimes be a tedious process that may be susceptible to electronic fraud.

SUMMARY OF DESCRIBED SUBJECT MATTER

In some embodiments, the present disclosure provides an exemplary technically improved computer-based method that includes at least the following steps of receiving, by at least one processor, an electronic access request to add a secondary electronic profile of a secondary user to a primary electronic profile of a primary user, where the electronic access request includes: a secondary user identifier identifying the secondary user and a primary user identifier identifying the primary user; determining, by the at least one processor, secondary user contact information associated with the secondary user based at least in part on the secondary user identifier; determining, by the at least one processor, primary user contact information associated with the primary user based at least in part on the primary user identifier; generating, by the at least one processor, a plurality of security challenges to authenticate the electronic access request; sending, by the at least one processor, at least one first security challenge of the plurality of security challenges to the primary user based at least in part on the primary user contact information, and sending, by the at least one processor, at least one secondary security challenge of the plurality of security challenges to the secondary user based at least in part on the secondary user contact information; receiving, by the at least one processor, a first response from a primary user device associated with the primary user in response to the at least one first security challenge; where the first response includes a primary user device identifier identifying the primary user device; determining, by the at least one processor, a first response time associated with the first response; receiving, by the at least one processor, a secondary response from a secondary user device associated with the secondary user in response to the at least one secondary security challenge; where the secondary response includes a secondary user device identifier identifying the secondary user device; determining, by the at least one processor, a secondary response time associated with the secondary response; determining, by the at least one processor, a user authentication that authenticates the electronic access request based at least in part on: the first response being a first valid response to the at least one first security challenge, the secondary response being a secondary valid response to the at least one secondary security challenge, the primary user device identifier and the secondary user device identifier being different, the first response time being within a first predefined time period from sending the at least one first security challenge, the secondary response time being within a secondary predefined time period from sending the at least one secondary security challenge, and the first response time and the secondary response time being received within a third predefined time period of each other; generating, by the at least one processor, the secondary electronic profile as a nested profile within the primary electronic profile, where the secondary electronic profile includes at least one access security permission to allow the secondary user to electronically access the primary electronic profile based at least in part on the secondary user identifier and the user authentication; and instructing, by the at least one processor, a display of at least one of the primary user device and the secondary user device to display a confirmation of the secondary user being added to the primary electronic profile based at least in part on the access security permission.

In some embodiments, the present disclosure provides the exemplary technically improved computer-based methods that further include determining, by the at least one processor, that the primary user device and the secondary user devices are different devices; and determining, by the at least one processor, a user authentication that authenticates the electronic access request based at least in part on the primary user device and the secondary user devices being different devices.

In some embodiments, the present disclosure provides the exemplary technically improved computer-based methods that further include receiving, by the at least one processor, a primary user location associated with the first valid response; receiving, by the at least one processor, a secondary user location associated with the secondary valid response; determining, by the at least one processor, a distance between the primary user location and the secondary user location; and determining, by the at least one processor, the user authentication based at least in part on the distance and a predetermined distance threshold.

In some embodiments, the present disclosure provides an exemplary technically improved computer-based system that includes at least the following components of at least one processor configured to execute software instructions, where the software instructions, when executed, cause the at least one processor to perform steps to: receive an electronic access request to add a secondary electronic profile of a secondary user to a primary electronic profile of a primary user; where the electronic access request includes: a secondary user identifier identifying the secondary user and a primary user identifier identifying the primary user; determine secondary user contact information associated with the secondary user based at least in part on the secondary user identifier; determine primary user contact information associated with the primary user based at least in part on the primary user identifier; generate a plurality of security challenges to authenticate the electronic access request; send at least one first security challenge of the plurality of security challenges to the primary user based at least in part on the primary user contact information, and send at least one secondary security challenge of the plurality of security challenges to the secondary user based at least in part on the secondary user contact information; receive a first response from a primary user device associated with the primary user in response to the at least one first security challenge; where the first response includes a primary user device identifier identifying the primary user device; determine a first response time associated with the first response; receive a secondary response from a secondary user device associated with the secondary user in response to the at least one secondary security challenge; where the secondary response includes a secondary user device identifier identifying the secondary user device; determine a secondary response time associated with the secondary response; determine a user authentication that authenticates the electronic access request based at least in part on: the first response being a first valid response to the at least one first security challenge, the secondary response being a secondary valid response to the at least one secondary security challenge, the primary user device identifier and the secondary user device identifier being different, the first response time being within a first predefined time period from sending the at least one first security challenge, the secondary response time being within a secondary predefined time period from sending the at least one secondary security challenge, and the first response time and the secondary response time being received within a third predefined time period of each other; generate the secondary electronic profile as a nested profile within the primary electronic profile, where the secondary electronic profile includes at least one access security permission to allow the secondary user to electronically access the primary electronic profile based at least in part on the secondary user identifier and the user authentication; and instruct a display of at least one of the primary user device and the secondary user device to display a confirmation of the secondary user being added to the primary electronic profile based at least in part on the access security permission.

In some embodiments, the present disclosure provides the exemplary technically improved computer-based systems that further cause the at least one processor to perform steps to determine that the primary user device and the secondary user devices are different devices; and determine a user authentication that authenticates the electronic access request based at least in part on the primary user device and the secondary user devices being different devices.

In some embodiments, the present disclosure provides the exemplary technically improved computer-based systems that further cause the at least one processor to perform steps to receive a primary user location associated with the first valid response; receive a secondary user location associated with the secondary valid response; determine a distance between the primary user location and the secondary user location; and determine the user authentication based at least in part on the distance and a predetermined distance threshold.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
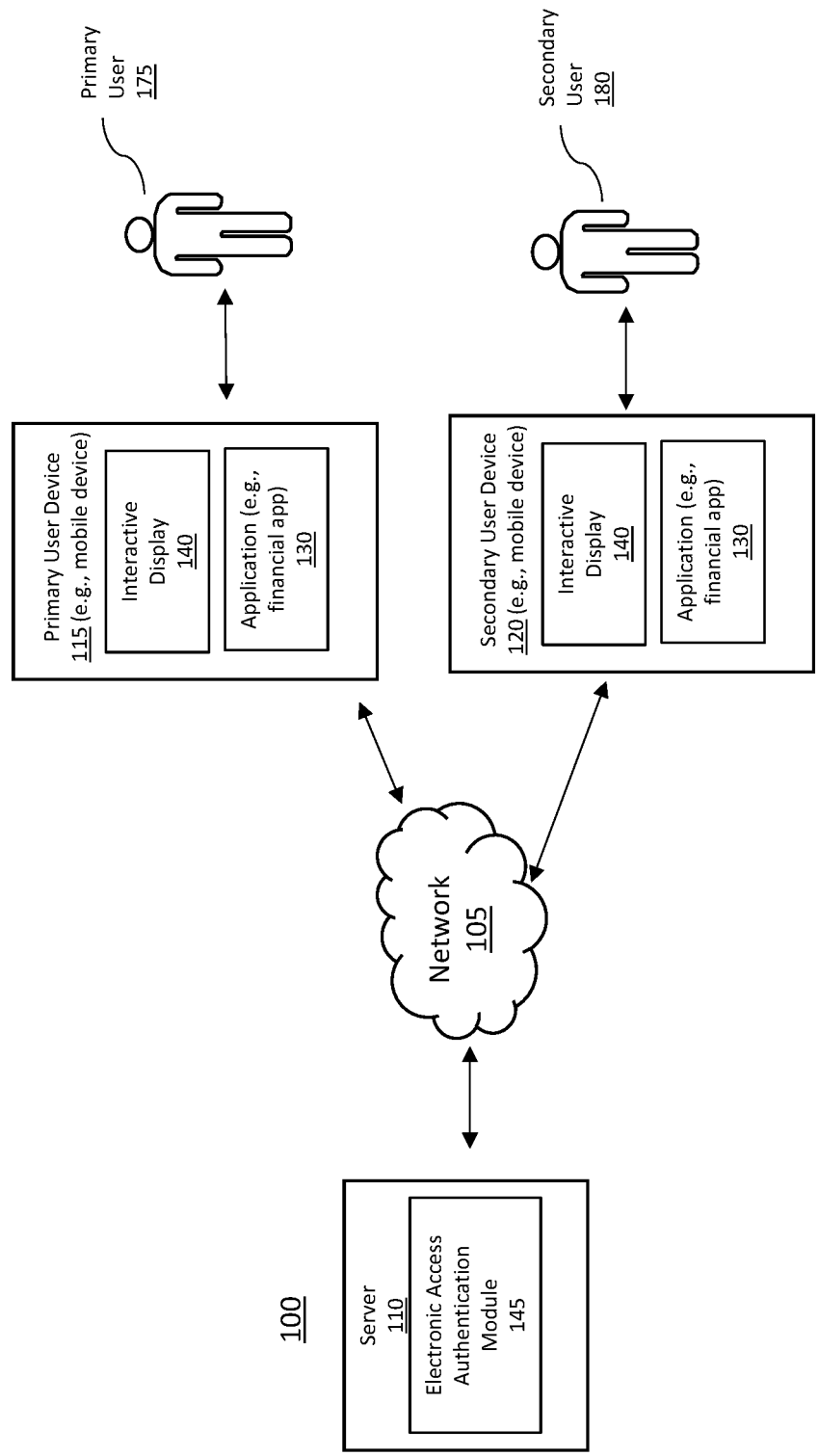
FIG. 1 is a block diagram illustrating an operating computer architecture for adding a secondary electronic profile of a secondary user to a primary electronic profile of a primary user, according to one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

As used herein, the term "customer" or "user" shall have a meaning of at least one customer or at least one user respectively.

As used herein, the term "mobile computing device", "user device" or the like, may refer to any portable electronic device that may include relevant software and hardware. For example, a "mobile computing device" can include, but is not limited to, any electronic computing device that is able to among other things receive and process alerts, credit offers, credit requests, and credit terms from a customer or financial institution including, but not limited to, a mobile phone, smart phone, or any other reasonable mobile electronic device that may or may not be enabled with a software application (App) from the customer's financial institution.

In some embodiments, a "mobile computing device" or "user device" may include computing devices that typically connect using a wireless communications medium such as cell phones, smart phones, tablets, laptops, computers, pagers, radio frequency (RF) devices, infrared (IR) devices, CBs, integrated devices combining one or more of the preceding devices, or virtually any mobile computing device that may use an application, software or functionality to receive and process alerts, credit offers, credit requests, and credit terms from a customer or financial institution.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

FIGS. 1 through 6 illustrate systems and methods for adding a secondary electronic profile of a secondary user to a primary electronic profile of a primary user in accordance with at least some embodiments of the present disclosure. The following embodiments provide technical solutions and technical improvements that overcome technical problems, drawbacks and/or deficiencies in at least one technical field involving the management of electronic profile access and identification of fraudulent activities related to the electronic profile. As explained in more detail below, the present disclosure provides a technically advantages computer architecture that improves security of user electronic accounts and profiles when electronically authorizing the adding of a secondary electronic profile to a primary electronic profile by requiring authentication of both the primary user and the secondary user within, for example, predetermined temporal or spatial parameters. In some embodiments, the system and methods are technologically improved by being programmed with machine-learning to identify characteristics of at least one of the primary electronic profile and secondary electronic profile that are indicators of a high risk for fraudulent activity. Some embodiments leverage the wide-spread use of mobile personal communication devices (e.g., smart phones with integrated location services and Near Field Communication (NFC) technology) to facilitate the authentication of the primary user and the secondary user. Based on such technical features, further technical benefits become available to users and operators of these systems and methods. Moreover, various practical applications of the disclosed technology are also described, which provide further practical benefits to users and operators that are also new and useful improvements in the art.

According to some embodiments, there is provided exemplary systems and methods for managing user electronic profile access. The user account access management solution of the present disclosure links a secondary electronic profile of a secondary user to a primary electronic profile of a primary user after authenticating the primary user and the secondary user via security challenges provided to their separate, respective, user devices. In some embodiments, the security challenges may include, for example, a one-time password, a request to confirm the identity of the primary user or the secondary user, or a request to tap a physical card to the user device. In some embodiments, the responses to the security challenges by the primary user and secondary user must be received within at least one of predetermined temporal or predetermined spatial parameters.

FIG. 1 is a block diagram illustration of an exemplary user account access management system 100 used to implement one or more embodiments of the present disclosure. The components and arrangements shown in FIG. 1 are not intended to limit the disclosed embodiments as the components used to implement the disclosed processes and features may vary. In accordance with disclosed implementations, the user account access management system 100 may include a server 110 in communication with a primary user device 115 and a secondary user device 120 via a network 105.

Network 105 may be of any suitable type, including individual connections via the internet such as cellular or Wi-Fi networks. In some embodiments, network 105 may connect participating devices using direct connections such as radio-frequency identification (RFID), near-field communication (NFC), Bluetooth™, low-energy Bluetooth™ (BLE), Wi-Fi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Server 110 may be associated with a financial institution. For example, server 110 may manage individual user accounts or process financial transactions. One of ordinary skill will recognize that server 110 may include one or more logically or physically distinct systems.

In some embodiments, the server 110 may include hardware components such as a processor (not shown), which may execute instructions that may reside in local memory and/or transmitted remotely. In some embodiments, the processor may include any type of data processing capacity, such as a hardware logic circuit, for example, an application specific integrated circuit (ASIC) and a programmable logic, or such as a computing device, for example a microcomputer or microcontroller that includes a programmable microprocessor.

Examples of hardware components may include one or more processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Primary user device 115 may be associated with a primary user 175 who is authorized to use a primary electronic account (e.g., an account holder). In some implementations, the primary electronic account may be a financial account. Secondary user device 120 may be associated with a secondary user 180 for whom the primary user 175 is requesting electronic access to the primary electronic account. When an electronic access requested by the primary user 175, the server 110 may prompt each of the primary user 175 and the secondary user 180 to provide user-identifying information and security challenge responses via their respective user devices 115, 120. Each of the primary user 175 and the secondary user 180 may provide such user-identifying information to the server 110, through the user devices 115, 120.

In some embodiments, the primary user device 115 and/or the secondary user device 120 are mobile computing devices. The primary user device 115 and/or the secondary user device 120, or mobile user devices, may generally include at least computer-readable non-transient medium, a processing component, an Input/Output (I/O) subsystem and wireless circuitry. These components may be coupled by one or more communication buses or signal lines. The primary user device 115 and/or the secondary user device 120 may be any portable electronic device, including a handheld computer, a tablet computer, a mobile phone, laptop computer, tablet device, a multi-function device, a portable gaming device, a vehicle display device, or the like, including a combination of two or more of these items.

It should be apparent that the architecture described is only one example of an architecture for the primary user device 115 and/or the secondary user device 120, and that the primary user device 115 and/or the secondary user device 120 can have more or fewer components than shown, or a different configuration of components. The various components described above can be implemented in hardware, software, or a combination of both hardware and software, including one or more signal processing and/or application specific integrated circuits.

In some embodiments, the wireless circuitry is used to send and receive information over a wireless link or network to one or more other devices' suitable circuitry such as an antenna system, an RF transceiver, one or more amplifiers, a tuner, one or more oscillators, a digital signal processor, a CODEC chipset, memory, etc. The wireless circuitry can use various protocols, e.g., as described herein.

At least one of the primary user device 115 or the secondary user device 120 may include an application such as a financial application 130 (or application software) which may include program code (or a set of instructions) that performs various operations (or methods, functions, processes, etc.), as further described herein.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the financial application 130 may enable users to access, view, and/or manage an existing financial account of the user. For example, in some embodiments, financial application 130 may allow the user to request to add a secondary financial account of a secondary user 180 to an existing financial account of the primary user 175. As discussed in further detail below, in some embodiments, the financial application 130 may provide push notifications to the primary user 175, prompting the primary user 175 to provide identifying information of the secondary user 180, which the primary user 175 would like to add to the primary electronic profile 125.

The primary user 175 may submit an electronic access request to add a secondary electronic profile 135 of the secondary user 180 to the primary electronic profile 125 via the primary user device 115. When an electronic access request is made, server 110 may prompt the primary user 175 to provide primary user-identifying information and secondary user-identifying information to the server 110. The primary user 175 may, through the user device 115, provide primary user-identifying information and secondary user-identifying information to the server 110. As non-limiting examples, the primary user-identifying information may include at least one of the primary user's name, social security number, mobile application login credentials, electronic account number, etc. As non-limiting examples, the secondary user-identifying information may include at least one of the secondary user's name, address, relationship to the primary user, etc.

As shown in FIG. 1, in some embodiments, at least one of the primary user device 115 or the secondary user device 120 may be a mobile computing device that includes an interactive display 140. In some embodiments, the financial application 130 may be an application provided by the financial entity. In one implementation, the financial application 130 may be automatically installed onto at least one of the primary user device 115 or the secondary user device 120 after being downloaded. In addition, in some embodiments, the financial application 130 or a component thereof may reside (at least partially) on a remote system (e.g., server 110) with the various components (e.g., front-end components of the financial app) residing on at least one of the primary user device 115 or secondary user device 120. As further described herein, the financial application 130 and the server 110 may perform operations (or methods, functions, processes, etc.) that may require access to one or more peripherals and/or modules. In the example of FIG. 1, the server 110 includes an electronic access authentication module 145.

In some embodiments, the electronic access authentication module 145 may be implemented as an application (or set of instructions) or software/hardware combination configured to perform operations for authenticating an electronic access request. In some embodiments, the electronic access authentication module 145 may utilize data and characteristics of the primary user 175 and the secondary user 180, such as, but not limited to, user-identifying information, user mobile device identifiers, location data, security challenge data, or any combination thereof, to determine if an electronic access request is at risk for fraudulent activity. In some embodiments, the electronic access authentication module 145 may calculate a fraud risk score by comparing the user-identifying information, location data and security challenge data to data and characteristics of other related electronic access requests, both of the primary user 175 and of other consumers, which have been identified as cases of fraud. In some instances, the primary user 175 and the secondary user 180 may be located a great distance from each other, their residential addresses, or their business addresses when the electronic access request is made. In other instances, at least one of the primary user 175 or the secondary user 180 may not respond to a security challenge within a predetermined time frame. In these instances, among others, the electronic access authentication module 145 may determine that the electronic access request has a high fraud risk score and the electronic access request may be denied.

In some embodiments, the electronic access authentication module 145 may be configured to utilize one or more machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments, the electronic access authentication module 145 may employ the Artificial Intelligence (AI)/machine learning techniques to determine predetermined thresholds for authentication of the electronic access request, as will be described in further detail below.

Figure 2:
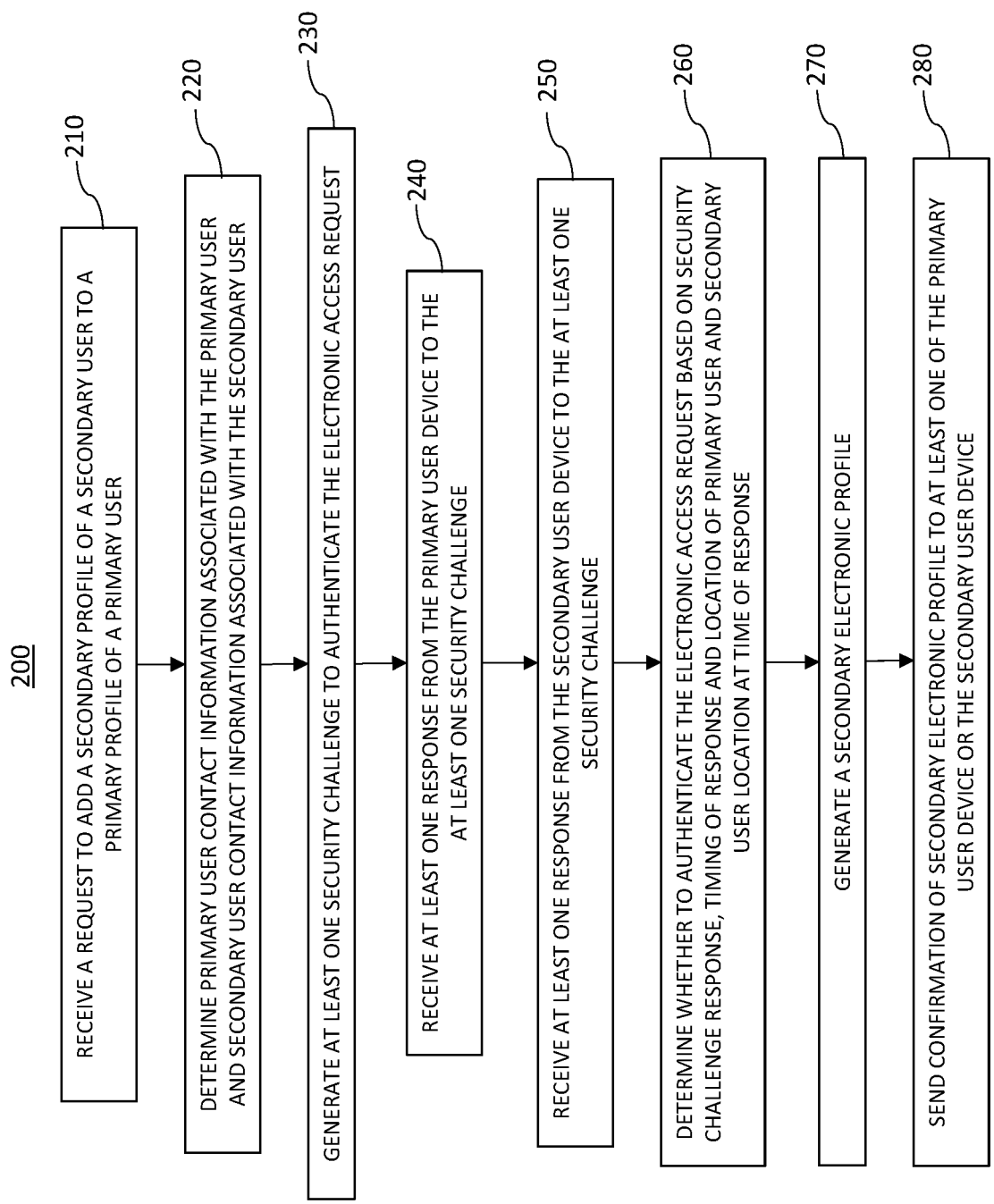
FIG. 2 is a process flow diagram illustrating an example of a computer-based process for adding a secondary electronic profile of a secondary user to a primary electronic profile of a primary user, according to one or more embodiments of the present disclosure.

FIG. 2 is a process flow diagram illustration of an example of an illustrated computer-mediated process for adding a secondary electronic profile 135 of a secondary user 180 to a primary electronic profile 125 of a primary user 175 according to one or more embodiments of the present disclosure. The exemplary computer-mediated process 200 may be executed by software, hardware, or a combination thereof. For example, process 200 may be performed by including one or more components described in the user account access management system 100 of FIG. 1 (e.g., server 110, primary user device 115 and secondary user device 120).

In 210, the exemplary computer-based system (e.g., the server 110) may receive a request to add a secondary electronic profile 135 of a secondary user 180 to a primary electronic profile 125 of a primary user 175. In some embodiments, the secondary electronic profile 135 addition request may include identifying information of the primary user 175 such as, for example, name, account number, account login credentials, etc. In some embodiments, the secondary electronic profile 135 addition request may also include identifying information of the secondary user 180 such as, for example, name, location, relationship to the primary user 175, age, etc.

In 220, the server 110 may determine secondary user contact information associated with the secondary user 180 based at least in part on the provided identifying information of the secondary user 180. Secondary user contact information may include at least one of: at least one device identifier, at least one telephone number, at least one email address, etc. The server 110 may also determine primary user contact information associated with the primary user based at least in part on the provided identifying information of the primary user. Primary user contact information may include at least one of: at least one device identifier, at least one telephone number, at least one email address, etc.

In 230, the electronic access authentication module 145 may generate at least one security challenge to authenticate the electronic access request. In some embodiments, after the server 110 receives the electronic access request to add the secondary user 180 to the primary electronic profile 125 of the primary user 175, the secondary user 180 may receive a physical credit card or debit card with a card number, or an electronic card number that is linked to the primary electronic profile 125 of the primary user 175. In some embodiments, the card must then be activated to generate the secondary electronic profile 135 for the secondary user 180. In order to prevent fraud by the primary user 175 or a separate bad actor, the at least one security challenge may be generated to authenticate the electronic access request prior to activation of the secondary electronic profile 135.

In some embodiments a security challenge may be sent to each of the primary user device 115 based on the primary user contact information associated with the primary user 175. In some embodiments, the security challenge may be sent to the primary user device 115 via a text message or an email. In some embodiments, the security challenge may be a pop-up notification that appears on the interactive display 140 of the primary user device 115. In some embodiments, the security challenge includes a text requiring the primary user 175 to enter a response to the security challenge.

In some embodiments, a security challenge may also be sent to the secondary user device 120 based on the secondary user contact information associated with the secondary user 180. For example, the security challenge may be sent to the secondary user device 120 via a text message or an email. In some embodiments, the security challenge may be a pop-up notification that appears on the display screen of the secondary device 120. In some embodiments, the security challenge includes a text requiring the secondary user 180 to enter a response to the security challenge.

In some embodiments, the at least one security challenge may be a request for a one-time password (OTP). For example, in some embodiments, the secondary user 180 may download the financial application 130 and register to use the credit or debit card by inputting the debit or credit card number into the financial application 130. Once the card number is provided, the server 110 may send an OTP to the respective mobile devices of the primary user 175 and the secondary user 180. In some embodiments, the OTP may be sent to each of the primary user device 115 and the secondary user device 120 via, for example, a separate text or email. The financial application 130 may then request that the primary user 175 and the secondary user 180 enter the OTP into their respective user devices for authentication.

In some embodiments, the at least one security challenge may be a request for the primary user 175 to confirm the identity of the secondary user 180, and vice versa. For example, in some embodiments, the financial application 130 on the primary user device 115 may provide the query "Is John Smith the requested secondary account holder?" with a user-selectable element including the options of "Yes" or "No". Additionally, the financial application 130 on the secondary user device 120 may provide the query "Is Jane Smith the primary account holder?" with a user-selectable element including the options of "Yes" or "No".

In some embodiments, where the physical card includes an RFID chip, the at least one security challenge may be a request to tap the physical card to the phone. For example, the server 110 may trigger the financial application 130 on the primary user device 115 to prompt the primary user 175 to tap the primary user physical card to the primary user device 115. Concurrently, in some embodiments, the server 110 may trigger the financial application 130 on the secondary user device 120 to prompt the secondary user 180 to tap the secondary user physical card to the secondary user device 120. In another embodiment, the server 110 may send at least one of a text message or an email to each of the primary user device 115 and the secondary user device 120, prompting the primary user 175 and the secondary user 180, respectively, to tap their respective physical credit or debits cards to thereto. In this embodiment, each of the physical cards of the primary user 175 and the secondary user 180 may include an RFID chip. Additionally, in this embodiment, each of the primary user device 115 and the secondary user device 120 may include near-field wireless (NFW) functionalities capable of reading the RFID chip of the credit or debit card.

In 240, the server 110 may receive at least one response from the primary user device 115 to the at least one security challenge sent to the primary user 175. In some embodiments, the primary user response may include a primary user device identifier that identifies the primary user device 115. In some embodiments, the primary user device identifier may be used to determine a make and model of the primary user device 115. For example, in some embodiments the primary user device identifier may be a unique customer identifier used to distinguish the primary user device 115, such an IDFA or an Android Ad Id.

In some embodiments, the primary user response may include additional data or inputs. For example, in the present embodiment, the primary user response may include a response time stamp. In other embodiments, the primary user response may include an IP address, location data, the operating system used by the primary user device 115, etc. In some embodiments, the additional data may be used by the electronic access authentication module 145 to authenticate the electronic access request, as will be described in further detail below.

In 250, the server 110 may receive at least one response from the secondary user device 120 to the at least one security challenge sent to the secondary user 180. In some embodiments, the secondary user response may include a secondary user device identifier that identifies the secondary user device 120. In some embodiments, the secondary user device identifier may be used to determine a make and model of the secondary user device 120. In some embodiments, the secondary user device identifier may be used to determine if the secondary user device 120 is a different device than the primary user device 115. For example, in some embodiments the secondary user device identifier may be a unique customer identifier used to distinguish the secondary user device 120, such an IDFA or an Android Ad Id.

In some embodiments, the secondary user response may include additional data or inputs. For example, in the present embodiment, the secondary user response may include a response time stamp. In other embodiments, the secondary user response may include an IP address, location data, the operating system used by the secondary user device 120, etc. In some embodiments, the additional data may be used by the electronic access authentication module 145 to authenticate the electronic access request, as will be described in further detail below.

In 260, the electronic access authentication module 145 may determine whether or not to authenticate the electronic access request. In some embodiments, the electronic access authentication module 145 may determine whether the electronic access request is at high risk for fraudulent activities based on a variety of factors. If the electronic access module 145 determines that there is a high risk for fraudulent activity, authentication of the electronic access request may fail, resulting in the electronic access request being denied. In some embodiments, machine-learning modeling is used to identify whether the electronic access request is at high risk for fraudulent activities.

In some embodiments, the determination to authenticate the electronic access request is based at least in part on each of the primary user's response and the secondary user's response to the at least one security challenge being valid. For example, in some embodiments where the at least one security challenge is an OTP, valid responses would be the correct input of the OTP by each of the primary user 175 and the secondary user 180. In another example, in some embodiments where the at least one security challenge is a request to tap the physical cards to the respective mobile devices, valid responses may be correct NFW readings of the RFID chips.

In some embodiments, the determination to authenticate the electronic access request may also be based at least in part on the primary user device identifier being different than the secondary user device identifier. If the primary user device identifier is the same as the secondary user device identifier, the determination may be to reject authentication. In addition, the determination may be to reject authentication if the primary user device 115 is the same as the secondary user device 120. Such a determination may help prevent against the primary user 175 obtaining a secondary electronic profile 135 for the purpose of performing fraudulent activity such as, for example, false transaction disputes.

In some embodiments, the determination to authenticate the electronic access request may also be based at least in part on the primary user's response time and the secondary user's response time being within a predetermined time period from the sending of the at least one security challenge. For example, in some embodiments, the electronic access authentication module 145 may require that each of the primary user 175 and the secondary user 180 respond to the respective security challenges within 30 minutes of receipt of the security challenges by their respective user devices 115, 120. If at least one of the primary user 175 or the secondary user 180 do not respond within the 30 minutes of receipt of the security challenge, authentication may fail, resulting in the electronic access request being denied. In other embodiments, the electronic access authentication module 145 may set a predetermined time period of, for example, 1 minute, 5 minutes, 10 minutes, 1 hour or 24 hours.

In some embodiments, the electronic access authentication module 145 may require that the primary user's response time and the secondary user's response time are within a predefined time period of each other. For example, in some embodiments, the electronic access authentication module 145 may require that the primary user 175 and the secondary user 180 respond to the respective security challenges within 24 hours, or 12 hours, or 2 hours or 30 minutes of one another. If at least one of the primary user 175 or the secondary user 180 do not respond within the this predetermined time period, authentication may fail, resulting in the electronic access request being denied.

In some embodiments, the determination to authenticate the electronic access request may also be based at least in part on a distance between a location of the primary user 175 and a location of the secondary user 180 at the time that they response to the security challenges. In some embodiments, the electronic access authentication module 145 may set a predetermined distance threshold. This predetermined distance threshold may be set based on, for example, at least one of a residential address of the primary user 175, a residential address of the secondary user 180, a business address of the primary user 175, a business address of the secondary user 180, etc. In some embodiments, the server 110 may determine a distance between the location where the primary user 175 sent the security challenge response and the location where the secondary user 180 sent the security challenge response. In some embodiments, the primary user location, at the time of the security challenge response, may be determined based on location functionalities, such as GPS, of the primary user device 115. Similarly, the secondary user location, at the time of the security challenge response, may be determined based on location functionalities, such as GPS, of the secondary user device 120. In some embodiments, at least one of the primary user location and the secondary user location may include, for example, a city, a street block or a street address. In some embodiments, if the distance between the location where the primary user 175 sent the security challenge response and the location where the secondary user 180 sent the security challenge response is greater than the predetermined threshold, the electronic access request is authenticated. In some embodiments, if the distance between the location where the primary user 175 sent the security challenge response and the location where the secondary user 180 sent the security challenge response is less than the predetermined threshold, the electronic access request is authenticated.

In additional or alternative embodiments, machine learning may be used to automatically adjust the distance or time thresholds over time. For example, the electronic access authentication module 145 may train a machine learning model to automatically adjust the distance or time threshold. In certain implementations, the distance or time threshold may be adjusted manually. For instance, to account for certain machine learning models that may have the risk of teaching themselves incorrectly, in some implementations, the system 100 may be programmed to allow for one or more manual corrections and adjustments to the distance or time threshold. For example, to account for an incorrectly trained machine learning model that sets the distance or time threshold too high, which results in misidentifying legitimate electronic access requests as fraudulent, such implementations allow a system administrator to manually reduce or increase the distance or time threshold.

Figure 3:
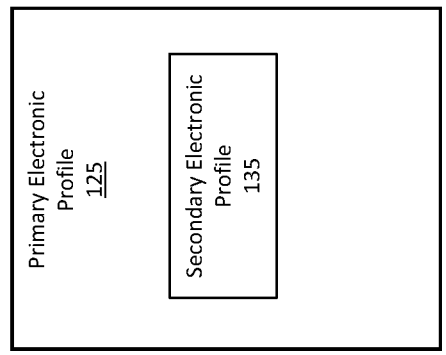
FIG. 3 is a schematic diagram depicting a secondary electronic profile as a nested profile within a primary electronic profile, according to one or more embodiments of the present disclosure.

In 270, if the secondary user 180 and the electronic access request is authenticated, the server 110 may generate the secondary electronic profile 135. In some embodiments, the secondary electronic profile 135 may be a nested profile within the primary electronic profile 125, as depicted in FIG. 3. For example, the nested profile may be a sub-profile or sub-account within the primary electronic profile 125 that allows the secondary user 180 access to, for example, funds of the primary electronic profile 125. In some embodiments, the primary user 175 may manage restrictions or capabilities of the nested profile. In some embodiments, the secondary electronic profile 135 may include at least one access security permission to allow the secondary user to electronically access the primary electronic profile 125 based at least in part on the secondary user identifier and the secondary user authentication. In some embodiments, the at least one access security permission establishes how and what the secondary user 180 can access in the primary electronic profile 125 via the nested profile. In some embodiments, the access security permission includes a subset of profile electronic access capabilities of the primary user. In some embodiments, the access security permission may restrict access of the secondary user 180 to the primary user profile. For example, the access security permission may include restrictions such as location restrictions, time restrictions, spending limits, spending frequency limits, etc.

In 280, a confirmation that the secondary user 180 is successfully added to the primary electronic profile 125 of the primary user 175 is sent to at least one of the primary user device 115 or the secondary user device 120. In some embodiments, the confirmation is sent as a pop-up notification to the display screen of at least one of the primary user device 115 or the secondary user device 120. In some embodiments, the confirmation is sent as an email or a text message.

Figure 4:
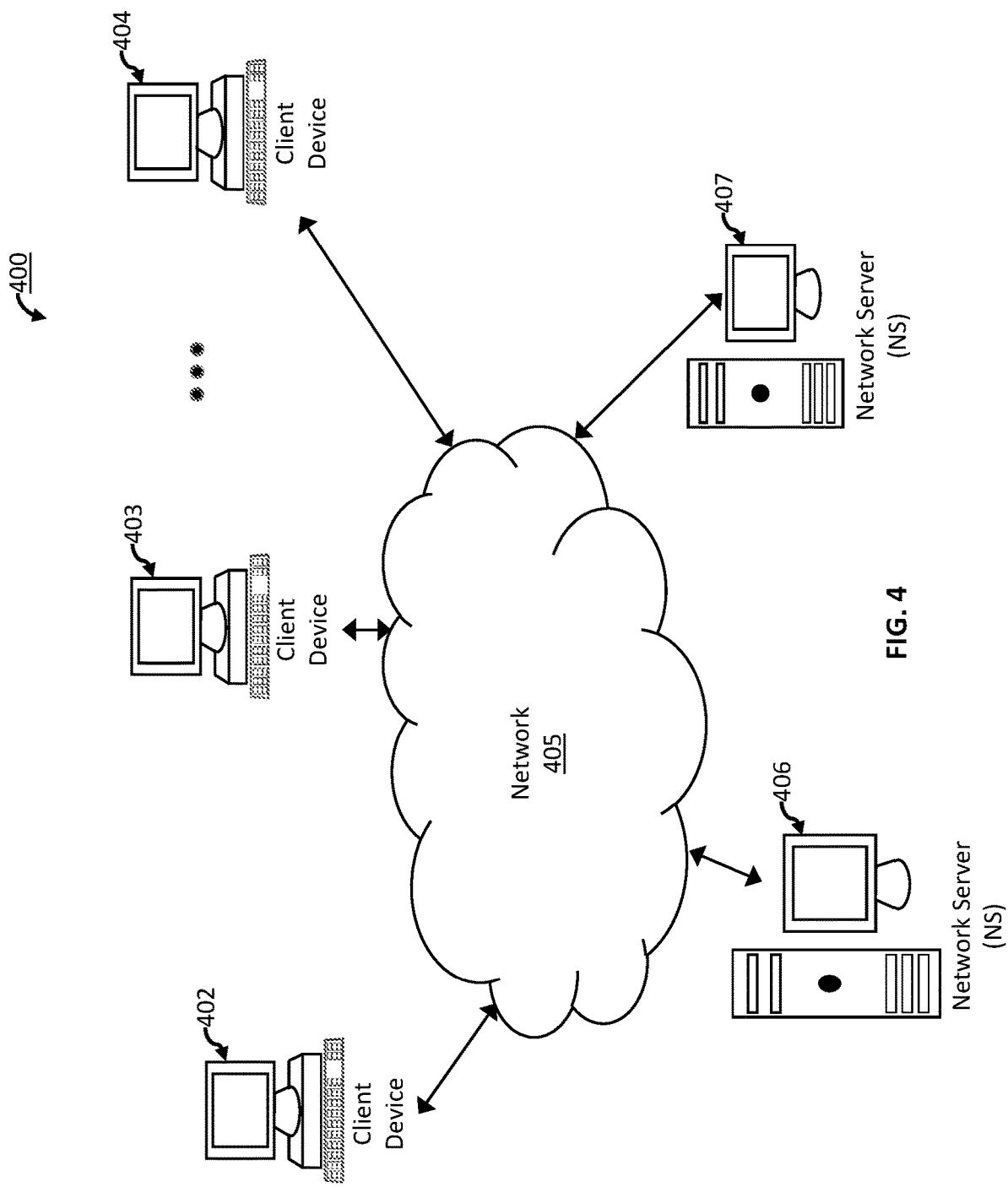
FIGS. 4-7 show one or more schematic flow diagrams, certain computer-based architectures, and/or screenshots of various specialized graphical user interfaces which are illustrative of some exemplary aspects of at least some embodiments of the present disclosure.

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, member computing device 402, member computing device 403 through member computing device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, GB-s citizens band radio, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Apache on Linux or Microsoft IIS (Internet Information Services). In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 5:
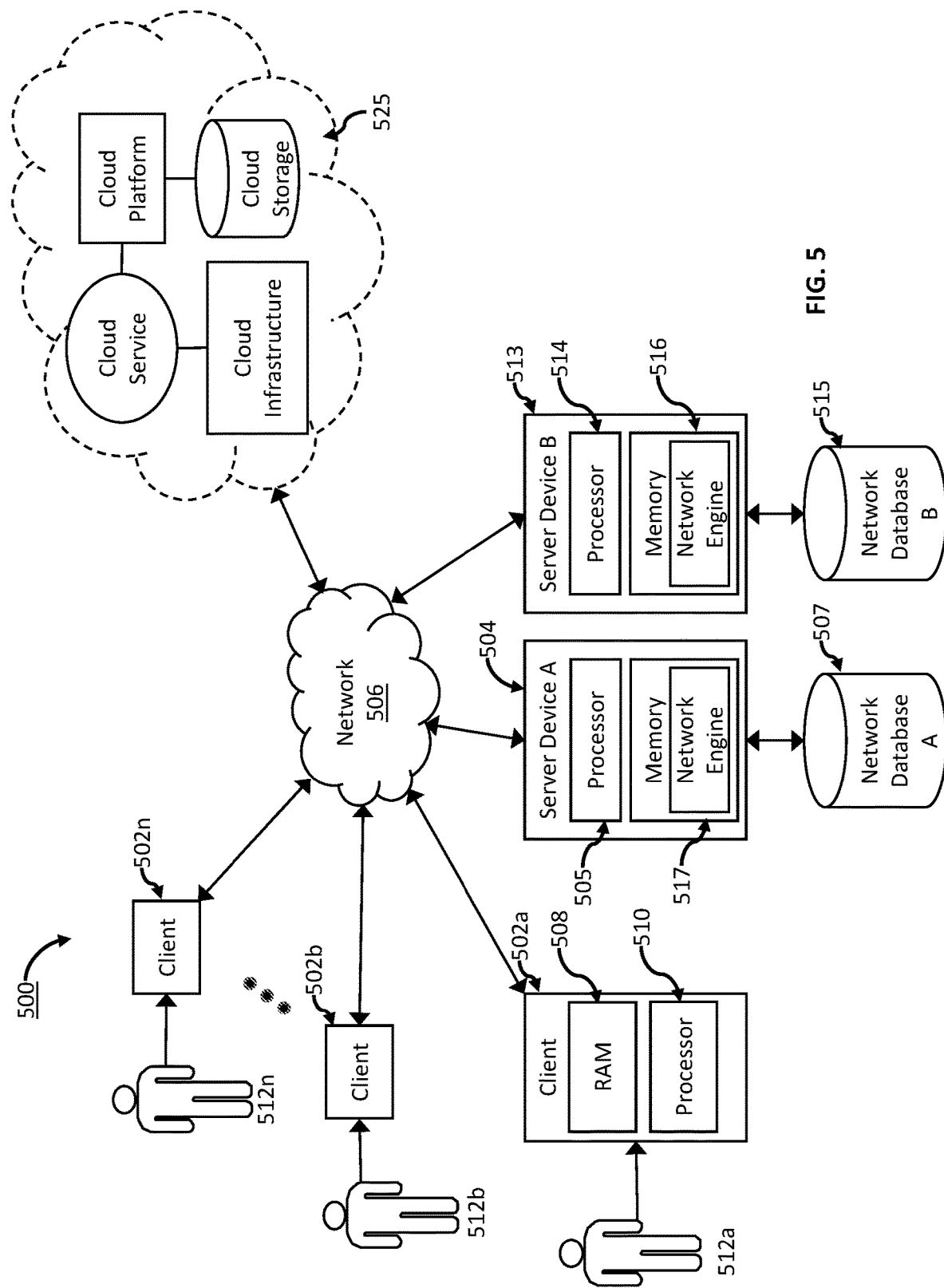

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 502a, member computing device 502b through member computing device 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application such as Microsoft Corporation's Internet Explorer™, Apple Computer, Inc.'s Safari™, Mozilla Firefox, and/or Opera. In some embodiments, through the member computing client devices 502a through 502n, user 512a, user 512b through user 512n, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
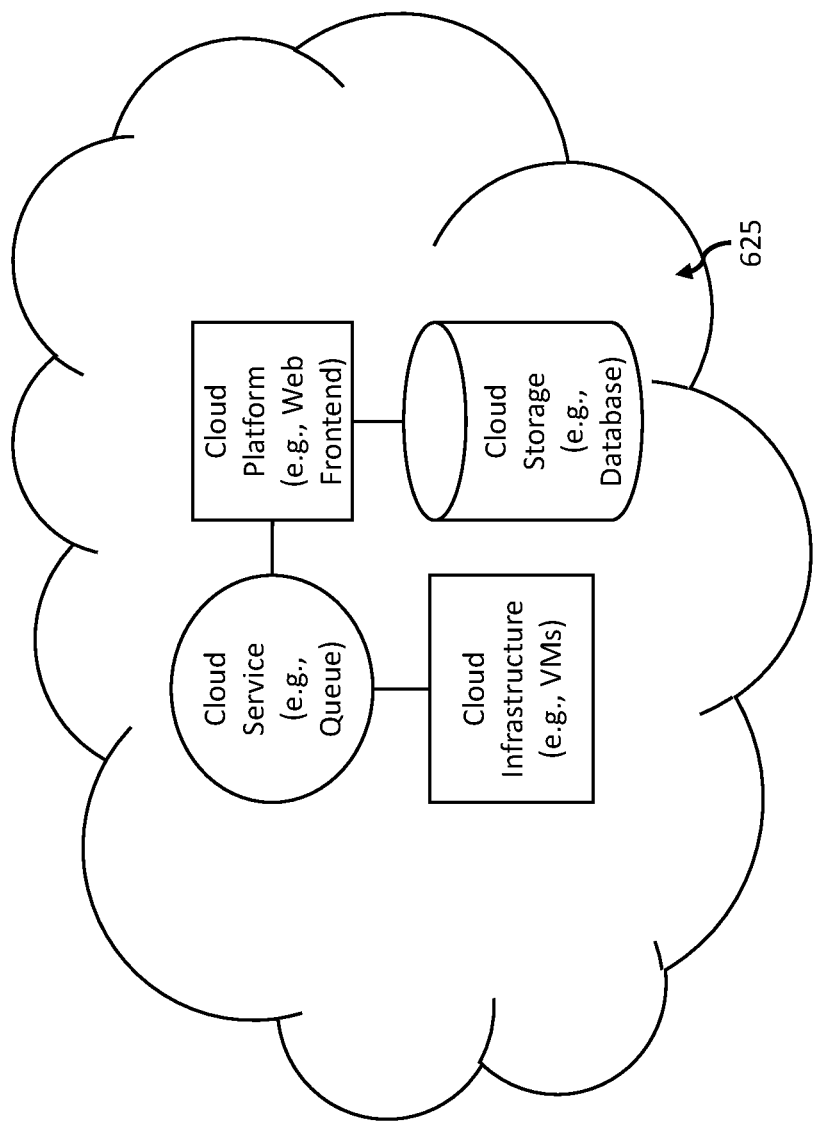
Figure 7:
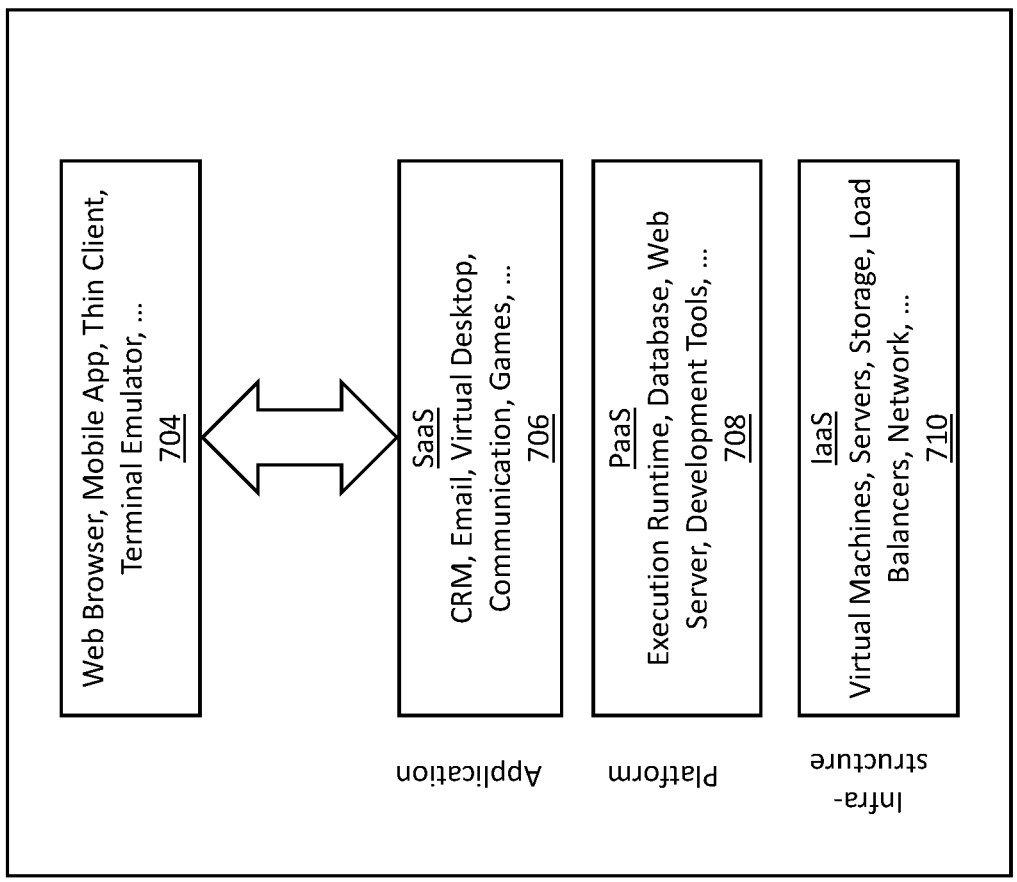

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

1. A method including:
  receiving, by at least one processor, an electronic access request to add a secondary electronic profile of a secondary user to a primary electronic profile of a primary user;
    where the electronic access request includes:
      a secondary user identifier identifying the secondary user, and
      a primary user identifier identifying the primary user;
  determining, by the at least one processor, secondary user contact information associated with the secondary user based at least in part on the secondary user identifier;
  determining, by the at least one processor, primary user contact information associated with the primary user based at least in part on the primary user identifier;
  generating, by the at least one processor, a plurality of security challenges to authenticate the electronic access request;
  sending, by the at least one processor, at least one first security challenge of the plurality of security challenges to the primary user based at least in part on the primary user contact information, and
  sending, by the at least one processor, at least one secondary security challenge of the plurality of security challenges to the secondary user based at least in part on the secondary user contact information;
  receiving, by the at least one processor, a first response from a primary user device associated with the primary user in response to the at least one first security challenge;
    where the first response includes a primary user device identifier identifying the primary user device;
  determining, by the at least one processor, a first response time associated with the first response;
  receiving, by the at least one processor, a secondary response from a secondary user device associated with the secondary user in response to the at least one secondary security challenge;
    where the secondary response includes a secondary user device identifier identifying the secondary user device;
  determining, by the at least one processor, a secondary response time associated with the secondary response;
  determining, by the at least one processor, a user authentication that authenticates the electronic access request based at least in part on:
    the first response being a first valid response to the at least one first security challenge,
    the secondary response being a secondary valid response to the at least one secondary security challenge,
    the primary user device identifier and the secondary user device identifier being different,
    the first response time being within a first predefined time period from sending the at least one first security challenge,
    the secondary response time being within a secondary predefined time period from sending the at least one secondary security challenge, and
    the first response time and the secondary response time being received within a third predefined time period of each other;
  generating, by the at least one processor, the secondary electronic profile as a nested profile within the primary electronic profile, where the secondary electronic profile includes at least one access security permission to allow the secondary user to electronically access the primary electronic profile based at least in part on the secondary user identifier and the user authentication; and
  instructing, by the at least one processor, a display of at least one of the primary user device and the secondary user device to display a confirmation of the secondary user being added to the primary electronic profile based at least in part on the access security permission.

2. The method as recited in clause 1, further including:
  determining, by the at least one processor, that the primary user device and the secondary user devices are different devices; and
  determining, by the at least one processor, a user authentication that authenticates the electronic access request based at least in part on the primary user device and the secondary user devices being different devices.

3. The method as recited in clause 1, where each of the primary user contact information and the secondary user contact information includes at least one of:
  at least one device identifier,
  at least one telephone number and
  at least one email address.

4. The method as recited in clause 1, further including:
  receiving, by the at least one processor, a primary user location associated with the first valid response;
  receiving, by the at least one processor, a secondary user location associated with the secondary valid response;
  determining, by the at least one processor, a distance between the primary user location and the secondary user location; and
  determining, by the at least one processor, the user authentication based at least in part on the distance and a predetermined distance threshold.

5. The method as recited in clause 4, where the user authentication authenticates the electronic access request based on the distance being less than the predetermined distance threshold.

6. The method as recited in clause 4, where the user authentication authenticates the electronic access request based on the distance being greater than the predetermined distance threshold.

7. The method as recited in clause 1, where the at least one access security permission includes a subset of profile electronic access capabilities of the primary user.

8. The method as recited in clause 1, where the security challenge includes at least one one-time password.

9. The method as recited in clause 1, where the security challenge, when sent to the primary user, causes the primary user device to display in a primary user device application to present a user selectable element allowing the primary user to confirm the secondary user; and where the security challenge, when sent to the secondary user, causes the secondary user device to display in a secondary user device application to present the user selectable element allowing the secondary user to confirm the secondary user.

10. The method as recited in clause 1, where the primary electronic profile is a financial account.

11. A system including:

at least one processor configured to execute software instructions, where the software instructions, when executed, cause the at least one processor to perform steps to:

receive an electronic access request to add a secondary electronic profile of a secondary user to a primary electronic profile of a primary user;

where the electronic access request includes:
a secondary user identifier identifying the secondary user, and
a primary user identifier identifying the primary user;

determine secondary user contact information associated with the secondary user based at least in part on the secondary user identifier;

determine primary user contact information associated with the primary user based at least in part on the primary user identifier;

generate a plurality of security challenges to authenticate the electronic access request;

send at least one first security challenge of the plurality of security challenges to the primary user based at least in part on the primary user contact information, and send at least one secondary security challenge of the plurality of security challenges to the secondary user based at least in part on the secondary user contact information;

receive a first response from a primary user device associated with the primary user in response to the at least one first security challenge;
where the first response includes a primary user device identifier identifying the primary user device;

determine a first response time associated with the first response;

receive a secondary response from a secondary user device associated with the secondary user in response to the at least one secondary security challenge;
where the secondary response includes a secondary user device identifier identifying the secondary user device;

determine a secondary response time associated with the secondary response;

determine a user authentication that authenticates the electronic access request based at least in part on:
the first response being a first valid response to the at least one first security challenge,
the secondary response being a secondary valid response to the at least one secondary security challenge,
the primary user device identifier and the secondary user device identifier being different,
the first response time being within a first predefined time period from sending the at least one first security challenge,
the secondary response time being within a secondary predefined time period from sending the at least one secondary security challenge, and
the first response time and the secondary response time being received within a third predefined time period of each other;

generate the secondary electronic profile as a nested profile within the primary electronic profile, where the secondary electronic profile includes at least one access security permission to allow the secondary user to electronically access the primary electronic profile based at least in part on the secondary user identifier and the user authentication; and instruct a display of at least one of the primary user device and the secondary user device to display a confirmation of the secondary user being added to the primary electronic profile based at least in part on the access security permission.

12. The system as recited in clause 11, where the software instructions, when executed, further cause the at least one processor to perform steps to:
determine that the primary user device and the secondary user devices are different devices; and
determine a user authentication that authenticates the electronic access request based at least in part on the primary user device and the secondary user devices being different devices.

13. The system as recited in clause 11, where each of the primary user contact information and the secondary user contact information includes at least one of:
at least one device identifier,
at least one telephone number and
at least one email address.

14. The system as recited in clause 11, where the software instructions, when executed, further cause the at least one processor to perform steps to:
receive a primary user location associated with the first valid response;
receive a secondary user location associated with the secondary valid response;
determine a distance between the primary user location and the secondary user location; and
determine the user authentication based at least in part on the distance and a predetermined distance threshold.

15. The system as recited in clause 14, where the user authentication authenticates the electronic access request based on the distance being less than the predetermined distance threshold.

16. The system as recited in clause 14, where the user authentication authenticates the electronic access request based on the distance being greater than the predetermined distance threshold.

17. The system as recited in clause 11, where the at least one access security permission includes a subset of profile electronic access capabilities of the primary user.

18. The system as recited clause 11, where the security challenge includes at least one one-time password.

19. The system as recited in clause 11, where the security challenge, when sent to the primary user, causes the primary user device to display in a primary user device application to present a user selectable element allowing the primary user to confirm the secondary user; and
where the security challenge, when sent to the secondary user, causes the secondary user device to display in a secondary user device application to present the user selectable element allowing the secondary user to confirm the secondary user.

20. The system as recited in clause 11, where the electronic user profile is a financial account.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
    receiving, by at least one processor, an electronic access request to add a secondary electronic profile of a secondary user to a primary electronic profile of a primary user;
        wherein the electronic access request comprises:
            a secondary user identifier identifying the secondary user, and
            a primary user identifier identifying the primary user;
    determining, by the at least one processor, secondary user contact information associated with the secondary user based at least in part on the secondary user identifier;
    determining, by the at least one processor, primary user contact information associated with the primary user based at least in part on the primary user identifier;
    generating, by the at least one processor, a plurality of security challenges to authenticate the electronic access request;
    sending, by the at least one processor, at least one first security challenge of the plurality of security challenges to the primary user based at least in part on the primary user contact information, and
    sending, by the at least one processor, at least one secondary security challenge of the plurality of security challenges to the secondary user based at least in part on the secondary user contact information;
    receiving, by the at least one processor, a first response from a primary user device associated with the primary user in response to the at least one first security challenge;
        wherein the first response comprises a primary user device identifier identifying the primary user device;
    determining, by the at least one processor, a first response time associated with the first response;
    receiving, by the at least one processor, a secondary response from a secondary user device associated with the secondary user in response to the at least one secondary security challenge;
        wherein the secondary response comprises a secondary user device identifier identifying the secondary user device;
    determining, by the at least one processor, a secondary response time associated with the secondary response;
    determining, by the at least one processor, a user authentication that authenticates the electronic access request based at least in part on:
        the first response being a first valid response to the at least one first security challenge,
        the secondary response being a secondary valid response to the at least one secondary security challenge,
        the primary user device identifier and the secondary user device identifier being different,
        the first response time being within a first predefined time period from sending the at least one first security challenge,
        the secondary response time being within a secondary predefined time period from sending the at least one secondary security challenge, and
        the first response time and the secondary response time being received within a third predefined time period of each other;
    generating, by the at least one processor, the secondary electronic profile as a nested profile within the primary electronic profile, wherein the secondary electronic profile comprises at least one access security permission to allow the secondary user to electronically access the primary electronic profile based at least in part on the secondary user identifier and the user authentication; and
    instructing, by the at least one processor, a display of at least one of the primary user device and the secondary user device to display a confirmation of the secondary user being added to the primary electronic profile based at least in part on the access security permission.

2. The method as recited in claim 1, further comprising:
    determining, by the at least one processor, that the primary user device and the secondary user devices are different devices; and
    determining, by the at least one processor, a user authentication that authenticates the electronic access request based at least in part on the primary user device and the secondary user devices being different devices.

3. The method as recited in claim 1, wherein each of the primary user contact information and the secondary user contact information comprises at least one of:
    at least one device identifier,
    at least one telephone number and
    at least one email address.

4. The method as recited in claim 1, further comprising:
    receiving, by the at least one processor, a primary user location associated with the first valid response;
    receiving, by the at least one processor, a secondary user location associated with the secondary valid response;
    determining, by the at least one processor, a distance between the primary user location and the secondary user location; and
    determining, by the at least one processor, the user authentication based at least in part on the distance and a predetermined distance threshold.

5. The method as recited in claim 4, wherein the user authentication authenticates the electronic access request based on the distance being less than the predetermined distance threshold.

6. The method as recited in claim 4, wherein the user authentication authenticates the electronic access request based on the distance being greater than the predetermined distance threshold.

7. The method as recited in claim 1, wherein the at least one access security permission comprises a subset of profile electronic access capabilities of the primary user.

8. The method as recited claim 1, wherein the security challenge comprises a request for at least one one-time password.

9. The method as recited in claim 1, wherein the security challenge, when sent to the primary user, causes the primary user device to display in a primary user device application to present a user selectable element allowing the primary user to confirm the secondary user; and wherein the security challenge, when sent to the secondary user, causes the secondary user device to display in a secondary user device application to present the user selectable element allowing the secondary user to confirm the secondary user.

10. The method as recited in claim 1, wherein the primary electronic profile is a financial account.

11. A system comprising:
at least one processor configured to execute software instructions, wherein the software instructions, when executed, cause the at least one processor to perform steps to:
receive an electronic access request to add a secondary electronic profile of a secondary user to a primary electronic profile of a primary user;
wherein the electronic access request comprises:
a secondary user identifier identifying the secondary user, and
a primary user identifier identifying the primary user;
determine secondary user contact information associated with the secondary user based at least in part on the secondary user identifier;
determine primary user contact information associated with the primary user based at least in part on the primary user identifier;
generate a plurality of security challenges to authenticate the electronic access request;
send at least one first security challenge of the plurality of security challenges to the primary user based at least in part on the primary user contact information, and
send at least one secondary security challenge of the plurality of security challenges to the secondary user based at least in part on the secondary user contact information;
receive a first response from a primary user device associated with the primary user in response to the at least one first security challenge;
wherein the first response comprises a primary user device identifier identifying the primary user device;
determine a first response time associated with the first response;
receive a secondary response from a secondary user device associated with the secondary user in response to the at least one secondary security challenge;
wherein the secondary response comprises a secondary user device identifier identifying the secondary user device;
determine a secondary response time associated with the secondary response;
determine a user authentication that authenticates the electronic access request based at least in part on:
the first response being a first valid response to the at least one first security challenge,
the secondary response being a secondary valid response to the at least one secondary security challenge,
the primary user device identifier and the secondary user device identifier being different,
the first response time being within a first predefined time period from sending the at least one first security challenge,
the secondary response time being within a secondary predefined time period from sending the at least one secondary security challenge, and the first response time and the secondary response time being received within a third predefined time period of each other;
generate the secondary electronic profile as a nested profile within the primary electronic profile, wherein the secondary electronic profile comprises at least one access security permission to allow the secondary user to electronically access the primary electronic profile based at least in part on the secondary user identifier and the user authentication; and
instruct a display of at least one of the primary user device and the secondary user device to display a confirmation of the secondary user being added to the primary electronic profile based at least in part on the access security permission.

12. The system as recited in claim 11, wherein the software instructions, when executed, further cause the at least one processor to perform steps to:
determine that the primary user device and the secondary user devices are different devices; and
determine a user authentication that authenticates the electronic access request based at least in part on the primary user device and the secondary user devices being different devices.

13. The system as recited in claim 11, wherein each of the primary user contact information and the secondary user contact information comprises at least one of:
at least one device identifier,
at least one telephone number and
at least one email address.

14. The system as recited in claim 11, wherein the software instructions, when executed, further cause the at least one processor to perform steps to:
receive a primary user location associated with the first valid response;
receive a secondary user location associated with the secondary valid response;
determine a distance between the primary user location and the secondary user location; and
determine the user authentication based at least in part on the distance and a predetermined distance threshold.

15. The system as recited in claim 14, wherein the user authentication authenticates the electronic access request based on the distance being less than the predetermined distance threshold.

16. The system as recited in claim 14, wherein the user authentication authenticates the electronic access request based on the distance being greater than the predetermined distance threshold.

17. The system as recited in claim 11, wherein the at least one access security permission comprises a subset of profile electronic access capabilities of the primary user.

18. The system as recited claim 11, wherein the security challenge comprises at least one one-time password.

19. The system as recited in claim 11, wherein the security challenge, when sent to the primary user, causes the primary user device to display in a primary user device application to present a user selectable element allowing the primary user to confirm the secondary user; and wherein the security challenge, when sent to the secondary user, causes the secondary user device to display in a secondary user device application to present the user selectable element allowing the secondary user to confirm the secondary user.

20. The system as recited in claim 11, wherein the electronic user profile is a financial account.

* * * * *